(12) United States Patent
Anand et al.

(10) Patent No.: US 8,271,937 B2
(45) Date of Patent: *Sep. 18, 2012

(54) SYSTEM AND METHOD FOR AUTOMATING GENERATION OF AN AUTOMATED SENSOR NETWORK

(75) Inventors: Minakshisundaran B. Anand, Germantown, MD (US); Rajesh Thakkar, Bangalore (IN); Prakash R. Chakravarthi, Gaithersburg, MD (US)

(73) Assignee: Cooper Technologies Company, Houston, TX (US)

( * ) Notice: Subject to any disclaimer, the term of this patent is extended or adjusted under 35 U.S.C. 154(b) by 1246 days.

This patent is subject to a terminal disclaimer.

(21) Appl. No.: 11/931,443

(22) Filed: Oct. 31, 2007

(65) Prior Publication Data

US 2008/0059947 A1    Mar. 6, 2008

Related U.S. Application Data

(63) Continuation of application No. 10/188,861, filed on Jul. 5, 2002, now Pat. No. 7,346,891.

(51) Int. Cl.
*G06F 9/44* (2006.01)
(52) U.S. Cl. .......................... 717/106; 717/107
(58) Field of Classification Search .................. 717/106, 717/107

See application file for complete search history.

(56) References Cited

U.S. PATENT DOCUMENTS

| | | | |
|---|---|---|---|
| 4,949,253 A | 8/1990 | Chigira et al. | |
| 5,038,296 A | 8/1991 | Sano | |
| 5,315,710 A | 5/1994 | Kishimoto et al. | |
| 5,715,461 A * | 2/1998 | Yoshitomi | 717/177 |
| 6,202,207 B1 | 3/2001 | Donohue | |
| 6,205,362 B1 | 3/2001 | Eidson | |
| 6,257,774 B1 | 7/2001 | Stack | |
| 6,317,872 B1 | 11/2001 | Gee et al. | |
| 6,339,832 B1 | 1/2002 | Bowman-Amuah | |
| 6,370,681 B1 * | 4/2002 | Dellarocas et al. | 717/110 |
| 6,487,713 B1 * | 11/2002 | Cohen et al. | 717/105 |
| 6,691,298 B1 | 2/2004 | Russo et al. | |
| 6,718,533 B1 * | 4/2004 | Schneider et al. | 717/100 |
| 2002/0066088 A1 | 5/2002 | Canut et al. | |
| 2002/0129333 A1 | 9/2002 | Chandhoke et al. | |
| 2003/0023950 A1 | 1/2003 | Ma et al. | |

OTHER PUBLICATIONS

Eidson, et al. "Improvements in the Efficient Composition of Applications Built using a Component-based programming environment", 2004, IEEE, p. 1-7.*

(Continued)

*Primary Examiner* — Qamrun Nahar
(74) *Attorney, Agent, or Firm* — King & Spalding LLP (57) ABSTRACT

An application software generator automatically generates an application software unit. The application software generator includes an application composer that combines components extracted from a component repository with an application framework to generate the application software unit. Each component in the component repository includes a component shell, a component interface and a component core. The application framework includes configurable parameters that determine how the application software unit is generated and operates. The configurable parameters can be entered by a user using a graphical user interface. The user can be assisted using a wizard format. The application framework also provides connectivity between components so that they can pass messages to one another. The connectivity can be, for example, by a message bus or event registry and event dispatch. Components themselves can be automatically generated using the application software generator. Uses of the application software generator include creation of sensor/actuator networks and test script generation.

52 Claims, 7 Drawing Sheets

● Indicates embedded sensor or actuator nodes

OTHER PUBLICATIONS

"The Koala Component Model for Consumer Electronics Software," R. Van Ommering, F. van der Linden, J. Kramer, J. Magee, IEEE Computer, vol. 33, No. 3, Mar. 2000, ISSN: 0018-9162, pp. 78-85.

"Specification and Production Techniques for Portable Software Components," D. Hardy, J.L. Sancey, XIII International Switching Symposium, vol. 2, May 27, 1990, XP010330647, pp. 183-189.

"Parameterized Specifications for Software Reuse", by Jingwen Cheng; Software Engineering Notes, ACM, New York, NY, US, vol. 17, No. 4, Oct. 1, 1992, pp. 53-59.

"Configuration Programming—A Framework for the Development of Distributable Systems", proceedings of the 1990 IEEE International Conference on Computer Systems and Software Engineering, Compeuro 90, May 8, 1990, XP002455352, ISBN 0-8186-2041-2, pp. 374-384.

"Professional Development with Visio® 2000", by David A. Edson; Sams Publishing, ISBN: 0-672-31813-X, Dec. 20, 1999; Chapter 6: "Linking Vision SmartShapes Symbols to Databases—The Visio Database Wizard"; URL: http://proquest.safaribooksonline.com/067231813X, 25 pages.

International Search Report from related PCT application serial No. PCT/US2003/020900, mailed Oct. 27, 2003 (4 pages).

* cited by examiner

SYSTEM AND METHOD FOR AUTOMATING GENERATION OF AN AUTOMATED SENSOR NETWORK

This application is a continuation of U.S. patent application Ser. No. 10/188,861 filed on Jul. 5, 2002, now U.S. Pat. No. 7,346,891 for which priority is claimed under 35 U.S.C. §120. The entire content of this applications are herein fully incorporated by reference.

BACKGROUND

1. Field of the Invention

This invention relates, in general, to sensor networking applications and, in particular, to the automatic generation of all the components of a sensor networking system to suit a particular application.

2. Background of the Invention

Large networks of sensors or actuators are believed to play an increasing role in a variety of applications. Such applications cover a wide range of applications including seismic monitoring, precision agriculture, environmental and atmospheric monitoring, automated electricity, gas and water meter reading, industrial control and automation etc.

While in each case the fundamental nature of the sensor or actuator network remains the same, i.e., to monitor one or more physical quantities and send the data to a back-end data processing system and to control an appliance or device, the wide variety of applications these networks will be employed in implies that the application software used in these networks will be completely different from application to application. Moreover, contrary to present information technology equipment, the application software that drives these networks of sensors or actuators will reside in most cases in small embedded "nodes" with very strict memory and energy constraints. This fact, in turn, implies that the software will be required to be highly optimized for each application.

The tasks of developing new custom application software for each of these applications, and optimizing and testing it will be extremely time and resource consuming. Application software development then becomes the major bottleneck in the rapid deployment of sensor networks. Thus, a scheme whereby the development of a new application for sensor or actuator networks can be largely automated is highly desirable. However, in considering any such automated scheme, the requirement for a high degree of optimization must be kept in mind. As mentioned earlier, by their very nature sensor networks require highly optimized software because of their tight constraints. Therefore, for example, a single platform software application that is capable of generally handling any application is highly unlikely to be a viable solution since such a generalized software will necessarily be sub-optimal for any particular application and may indeed not meet the constraints.

Examples of automated software generation do exist in the prior art. One category of these examples uses a library of parts from which parts are picked to generate new programs. U.S. Pat. No. 4,949,253, issued to Eiki Chigira et al, and incorporated herein for reference, describes one such scheme whereby parts are picked from a library to form a whole application. In order to allow the parts to co-exist and co-operate—a requirement in any application—their interfaces are changed according specifications entered by the user so that a part's interface can be matched to another part's interface. The first problem in this scheme is that the user must pick the parts to be integrated; there is no provision for automation. The second major problem with this approach is that interfaces must be changed according to specifications entered by the user, who is thus forced to examine parts and construct ways to achieve matches between mismatched parts. The degree of automation in this scheme is thus only partial and the scheme becomes impractical when there are a large number of parts to combine. U.S. Pat. No. 5,315,710, issued to Kishimoto et al., and incorporated herein for reference, provides another example in the same category. In this patent, parts are again chosen from a library but the modifications to the interfaces of the parts to allow for parts to co-operate proceeds according to pre-defined rules. Therefore, once again, the user is forced to invent rules for each possible mismatch. Further, even if the rules are in place, the rule mechanism used to match the interfaces is necessarily limited in its scope and cannot handle complex situations such as a part needing to interface to multiple other parts, or vice versa. Such situations however commonly arise in complex application software.

A different category of automated application software synthesizer is proposed in U.S. Pat. No. 5,038,296, issued to Yasuko Sano, and incorporated herein for reference. In this system, a specification set and a rule set define a target program through the description of operations to be performed on a data represented by variables. This system suffers from the disadvantage that the specification set essentially outlines the target program, with the rules describing the functional sub-steps to perform during program synthesis. Thus, a close concordance is required between the specification, the rules and the target program to synthesize a program. In a complex application software requiring many simultaneous interactions and multiple threads of execution, the specification will become equally complex and will be akin to writing the whole application software.

Yet another type of automated program generator is described in U.S. Pat. No. 6,257,774, issued to Brian T. Stack and incorporated herein for reference. This patent describes a system whereby the application software is divided into a hierarchical tree of sub-systems. The user then chooses the required functionality by picking units, from presumably a pre-existing list of such units, at each level of the tree using an image editor, and customizes the data fields of each unit. Thus, this patent too requires the user to actually choose the sub-units of the program.

Other categories of automated program generators have been proposed. These are based on expert systems that typically simplify the input required from the user. These expert systems are complex and difficult to maintain and, moreover, do not produce compilable or executable programs. It is thus seen that all automated application software generation schemes proposed in the prior art have particular failings.

A further major shortcoming of all systems in the proposed art is that none of these schemes makes any provision for evaluating the performance metrics of the generated application software. As mentioned earlier, the constraints of memory, energy and computational power in a sensor network are extremely tight. Thus, it naturally follows that any automated application software system targeted for sensor networking applications must make provisions for evaluating such performance metrics for the generated application. The fact that none of the systems described in the prior art make such a provision renders them largely unsuitable for use in automated generation of application software for sensor networking applications.

It is thus the objective of the present invention to provide a system that allows fully automated generation of application software for sensor or actuator networks with only minimal user input. A further objective of the present invention is that such an automated generation system also provide the capability to evaluate performance metrics for the automatically generated software.

SUMMARY OF THE INVENTION

According to the present invention, the application software is automatically constructed using a common framework that allows multiple components to co-exist and co-operate. Each component is provided with standard interfaces that allow it plug into the framework. Further, such standard interfaces can also be automatically constructed given a functional software core. Each component is also provided with a shell that contains metric information, thus allowing the calculation of performance metrics. The shell can be stripped from components when the application software is constructed to eliminate resource waste.

In one embodiment, the present invention is a system for automatically generating an application software unit. The system includes a component repository comprising one or more components. An application framework stores parameter information regarding how the application software unit is to be built and operate. In addition, the system includes an application composer that uses information in the application framework to extract one or more components from the component registry and configure the one or more components according to the information in the application framework to generate the application software unit.

In another embodiment, the present invention is a method for automatically generating an application software unit. The method begins with the step of receiving values of one or more configurable parameters. The method continues with the step of extracting one or more components from a component registry in accordance with the received values. The method then continues with the step of combining the components with an application framework to generate the application software component.

In another embodiment, the present invention is a system for automatically generating an application software unit. The system includes means for receiving values of one or more configurable parameters and means for extracting one or more components from a component registry in accordance with the received values. The system also includes means for combining the components with an application framework to generate the application software component.

DETAILED DESCRIPTION OF THE INVENTION

Figure 1:
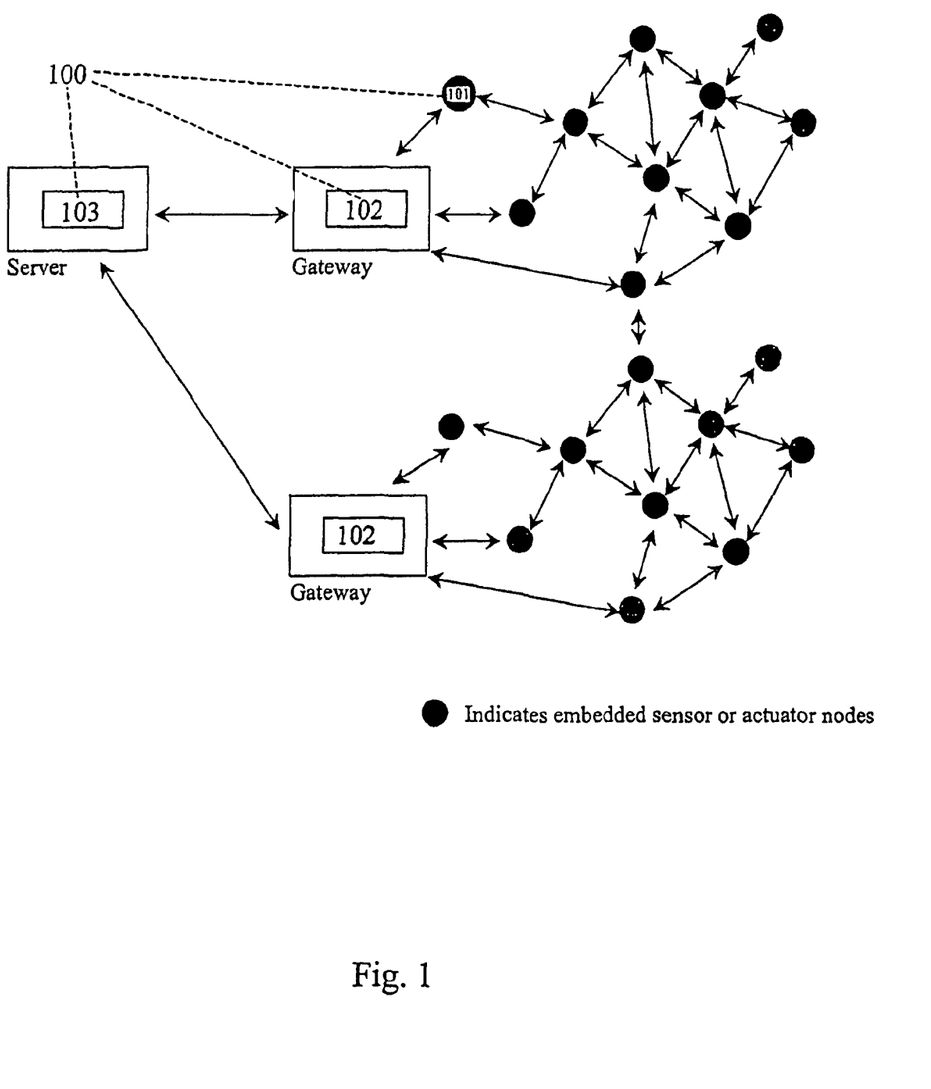
FIG. 1 is a schematic diagram of a network of actuators and/or sensors using automatically generated application software units according to an embodiment of the present invention.

A first embodiment of the invention is now described. FIG. 1 shows the conceptual diagram of a sensor or actuator network. The dark circles in the figure denote sensor or actuator nodes and the bi-directional arrows indicate bi-directional communication channels.

As can be seen from FIG. 1, the automatically generated executable application software 100 comprises three units: an executable software unit 101 resident on embedded sensor or actuator nodes, an executable software unit 102 resident on gateways which collect data from or control the operation of a plurality of said sensor nodes, and an executable software unit 103 resident on a server which collects data from or controls the operation of a plurality of said gateways.

The software unit 101 resides in the embedded sensor or actuator nodes and may, for example, perform functions such as:
i) monitoring and control functions such as periodically or continuously monitoring sensor data, monitoring sensor data upon receipt of appropriate commands from the gateway and controlling an actuator upon receipt of appropriate commands from the gateway,
ii) performing data processing functions on the monitored data to obtain derived data quantities,
iii) storing samples of the data at periodic intervals for later retrieval,
iv) sending out alarm signals over a communications link to the gateway based on certain conditions such as the monitored data exceeding pre-set thresholds, and
v) responding to various commands from the gateway for configuring embedded sensor or actuator nodes or for performing monitoring and control functions.

The data processing functions performed by the software unit 101, may, for example, include filtering of digital sample data from the sensors, compression of data, performing mathematical calculations such as derivative calculation and integration, and performing transformations according to mathematical functions such as Fourier transforms.

It will be noted that regardless of the type of sensor or actuator, the software unit 101 should provide various configuration parameters which may, for example, include, number of channels of data, types and sizes of data for each channel, units of measure of data, periodicity of data collection, alarm thresholds and periodicity and time-of-day of reporting stored data to the gateways. While these parameters will be programmable if necessary when the sensor or actuator network is in operation, the software unit 101 will have default values for each of these parameters.

The main function of the executable software unit 102 that resides in the gateways is to manage multiple sensors or actuators. It may, for example, perform functions such as:
i) storing data reported by the sensors as well as all configuration information for each sensor or actuator,
ii) monitoring the correct operation of sensor or actuator nodes, iii) storing alarms reported by sensors or actuators and forwarding alarms to server systems, iv) responding to various commands from the server systems for retrieving stored data, checking the configuration and status of sensors or actuators, and v) providing a command interface for allowing a server system to configure sensor or actuator nodes or for sending commands to sensor or actuator nodes to perform monitoring and control functions.

Once again it will be noted that regardless of the type of the sensor or actuator network, the software unit 102 should provide various configuration parameters which may, for example, include, the maximum number of sensors to manage, amount of data storage to allocate to each sensor, indication of whether a sensor will report automatically at predetermined times or the gateway should actively collect data from the sensor, periodicity and time of data collection or reporting from sensors, parameters pertaining to the servers that the gateway would be communicating with such as a server Internet address or telephone number (in case of a modem connection). While these parameters will be programmable if necessary when the gateway is in operation, the software unit 102 will have default values for each of these parameters.

The software unit 103 resides in a server system and may, for example, perform such functions as:

i) collecting data from multiple gateways periodically, ii) performing data conversion to other formats for export to other server systems, iii) presenting alarms reported by sensors or actuators and forwarded by gateways through an user interface, iv) allowing a user to check the status of any sensor or actuator through a user interface that shows the whole sensor or actuator network and associated gateways, and v) allowing a user configure a sensor or actuator or a group of sensors or actuators through the user interface.

Here, it is seen that the software unit 103 is of a fundamentally uniform nature without regard to the type of the type of sensor or actuator network. In all such networks, the software unit 103 performs similar functions, but may differ in its operation only in such respects as the periodicity of the data collection, the format of the data and the total number of gateways and sensors it manages.

It is thus seen from the above the description of the executable application software units 101, 102 and 103 that constitute the executable application software 100 of a sensor or actuator network that all these units are of a fundamentally similar nature. However, between one type of sensor or actuator network and another, they differ in two respects:

i) various parameters that control the behavior of the application software units differ from one network to the other, and ii) the required functional components of the units differ from one network or the other.

Figure 2:
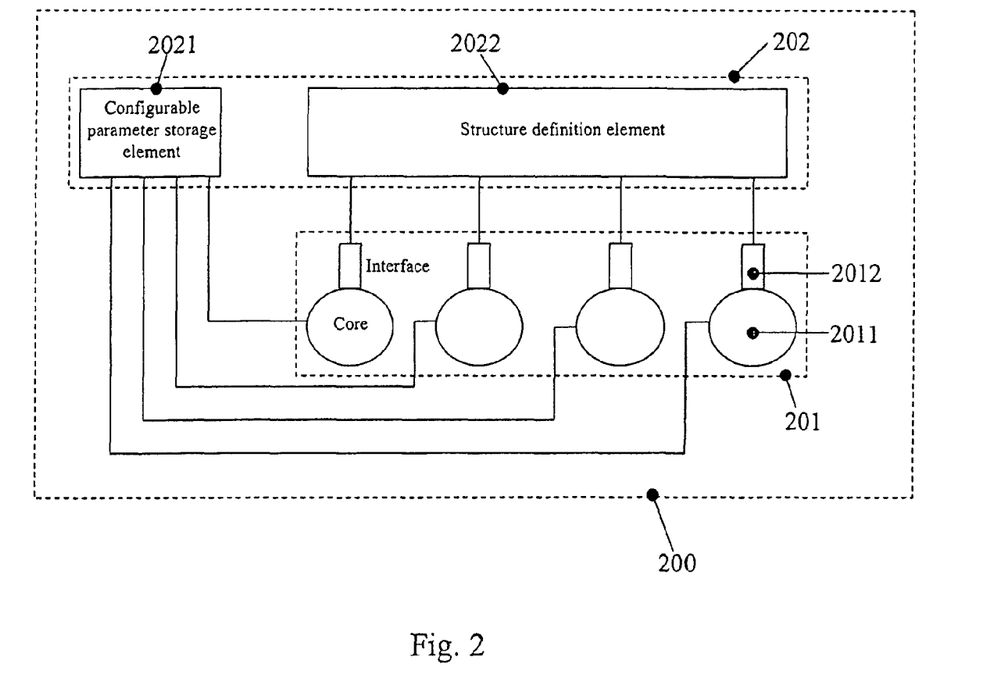
FIG. 2 is a schematic diagram of a common structure for constructing application software units according to an embodiment of the present invention.

Thus, according to the present invention, each of the application software units is constructed according to a common structure which facilitates automatic generation of the units for various sensor or actuator networks. This common structure is shown in FIG. 2.

Each software unit is constructed with a common structure 200 that comprises two elements: a set of components 201 that perform the functions of the software unit and a framework 202. Each component in the set of components 201 performs one or more logically related functions. Examples of such components are: data collection, data storage, data reporting, command processing and alarm generation in an embedded sensor software unit; sensor monitoring, management and data storage in a gateway software unit; and user interface, data collection and conversion in a server software unit. Further, each component itself has a common structure comprising a functional core 2011 and an interface 2012 that allows it communicate with other components. The means provided in the structure 200 for this communication between components is described in detail below.

The framework 202 further comprises two elements, a configurable parameter storage element 2021 and a structure definition element 2022. The configurable parameter storage 2021 stores all the configurable parameters of the software unit described earlier. The components 201 perform their respective functions according to parameter values stored in the parameter storage element 2021. As can be seen from FIG. 2, the structure definition element 2022, in essence, provides a mechanism that allows the components 201 to co-exist and co-operate within the common structure 200. In particular, the structure definition element 2022 provides the means for the components 201 to communicate with each other, or cause certain actions to be taken in one or more components upon the occurrence of a certain event in another component, and thus is the common thread that ties all components together to form a complete functioning application software unit.

Figure 3A:
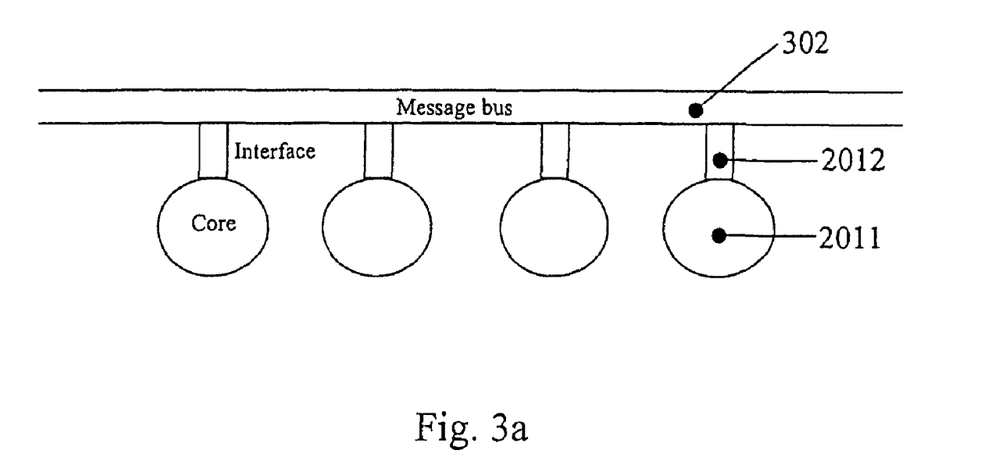
FIG. 3a is a schematic diagram of a structure allowing components in an application software unit to interact according to one embodiment of the present invention.
Figure 3B:
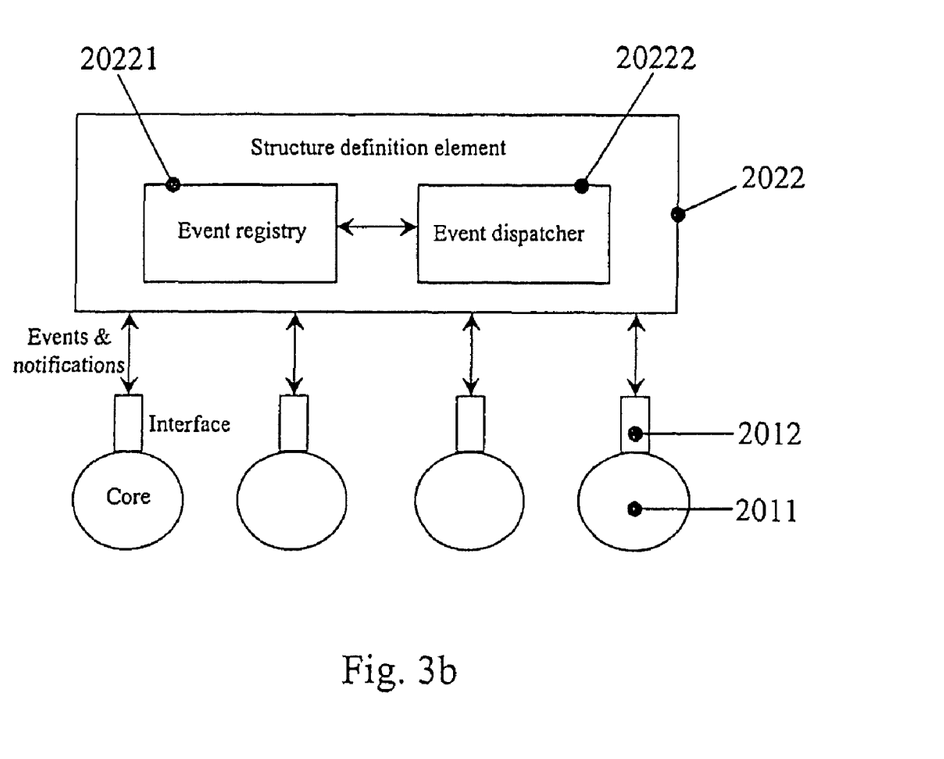
FIG. 3b is a schematic diagram of a structure allowing components in an application software unit to interact according to another embodiment of the present invention.

The means provided by the structure definition element 2022 for the component interaction is now described with reference to FIGS. 3a and 3b. One means for the component interaction is shown in FIG. 3a. In the embodiment shown in FIG. 3a, a message bus 302 allows any component to send or receive a message. The format of the messages is pre-defined and each component is provided with a unique address on the message bus, thus enabling each component to communicate with any other component through a common language. Another means for the component interaction is shown in FIG. 3b. In the embodiment shown in FIG. 3b, an event notification registry 20221 is provided in the structure definition element 2022. Event notification registry 20221 provides a place where each component can register both the events it will supply and the events it wishes to be notified of. When an event occurs in a component, an event dispatcher 20222 in the structure definition element 2022 is notified of the occurrence of the event. The event dispatcher 20222 consults the event registry to send notifications of the event to each component that has registered to be notified of that event. The components that receive the event can then take appropriate action as required.

The means for providing component interaction illustrated in FIGS. 3a and 3b can be combined. For example, the event notification scheme shown in FIG. 3b may be used to notify components of events that have occurred in a component. The receiving components may then communicate with the originating component through the message bus 302 to perform additional actions as shown in FIG. 3a.

Figure 4:
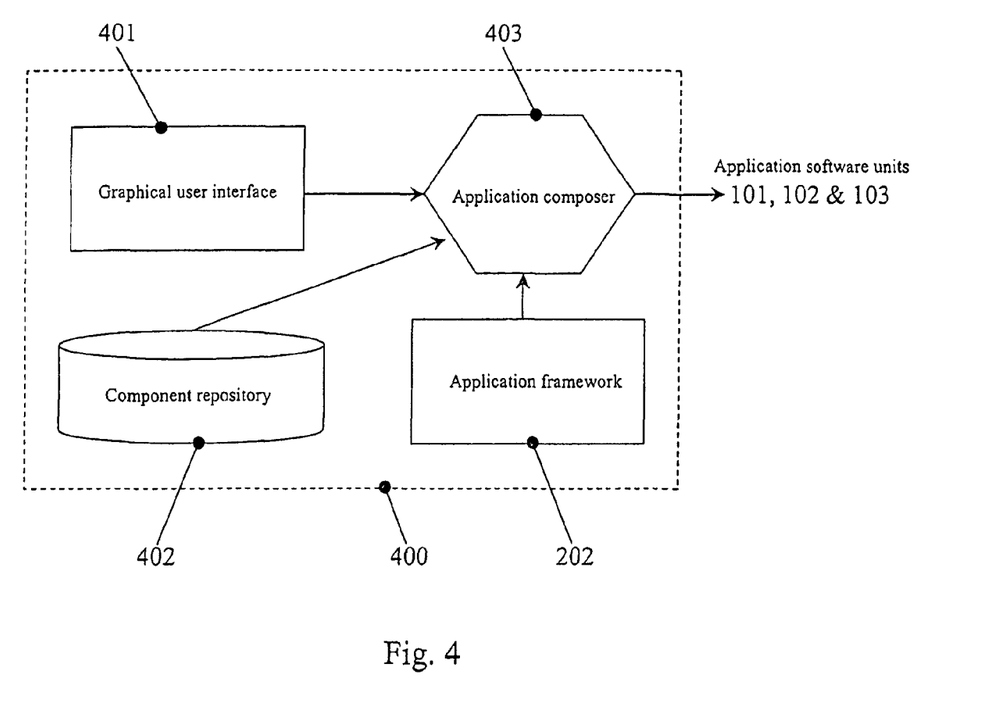
FIG. 4 is a schematic diagram of a system for automatically generating software application units according to an embodiment of the present invention.

Having thus described the structure of the application software 100 and its constituent units 101, 102 and 103, the automatic generation of these units is now described. A conceptual block diagram of the system 400 according to the present invention that is capable of generating the executable application software 100 is shown in FIG. 4. The system 400 comprises a graphical user interface 401, a repository of components 402, an application composer 403 and the application framework 202.

The graphical user interface 401 obtains user input regarding the various configurable parameters of sensor or actuator network. Examples of these configurable parameters were provided earlier. The graphical user interface 401 may, for example, follow a "wizard" format guiding the user step-by-step through the process of inputting various values for the configurable parameters. It may also, for example, organize the configurable parameters in a plurality of logically related groups and allow the user to input the parameter values in each group separately. These and other schemes of user interface arrangement and presentation are well known in the art.

Figure 5:
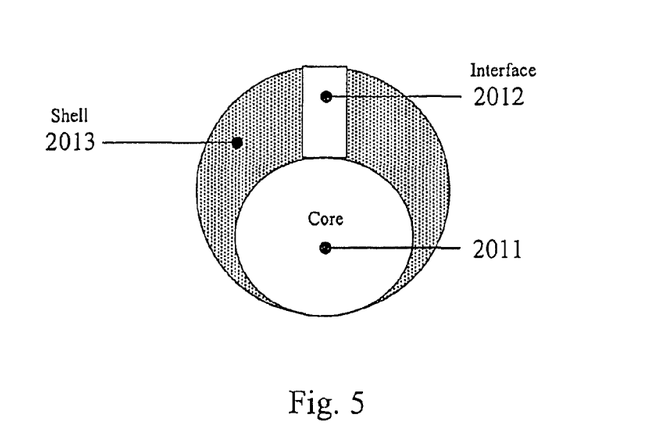
FIG. 5 is a schematic diagram of a component as stored in a component repository according to an embodiment of the present invention.

The repository of components 402 contains all the components (described earlier), for constructing the application software units. The repository may, for example, be structured as a database of components or as an indexed directory of files. The components contained in the repository are of a structure that is somewhat different from the structures described earlier in FIG. 2. The structure of the components in the repository 402 is shown in FIG. 5. Besides the functional core 2011 and the interface 2012 (described earlier), the repository components are further provided with a shell 2013. This shell 2013 contains information pertaining to the component according to a pre-defined format. For example, the shell 2013 may provide descriptive elements such as the name of component, the function it provides and the algorithm and methods it uses. The shell 2013 may also contain further information concerning the performance metrics of the component. For example, the shell 2013 may also provide elements such as memory usage, code size and computation power required in millions of instructions per second.

Figure 6:
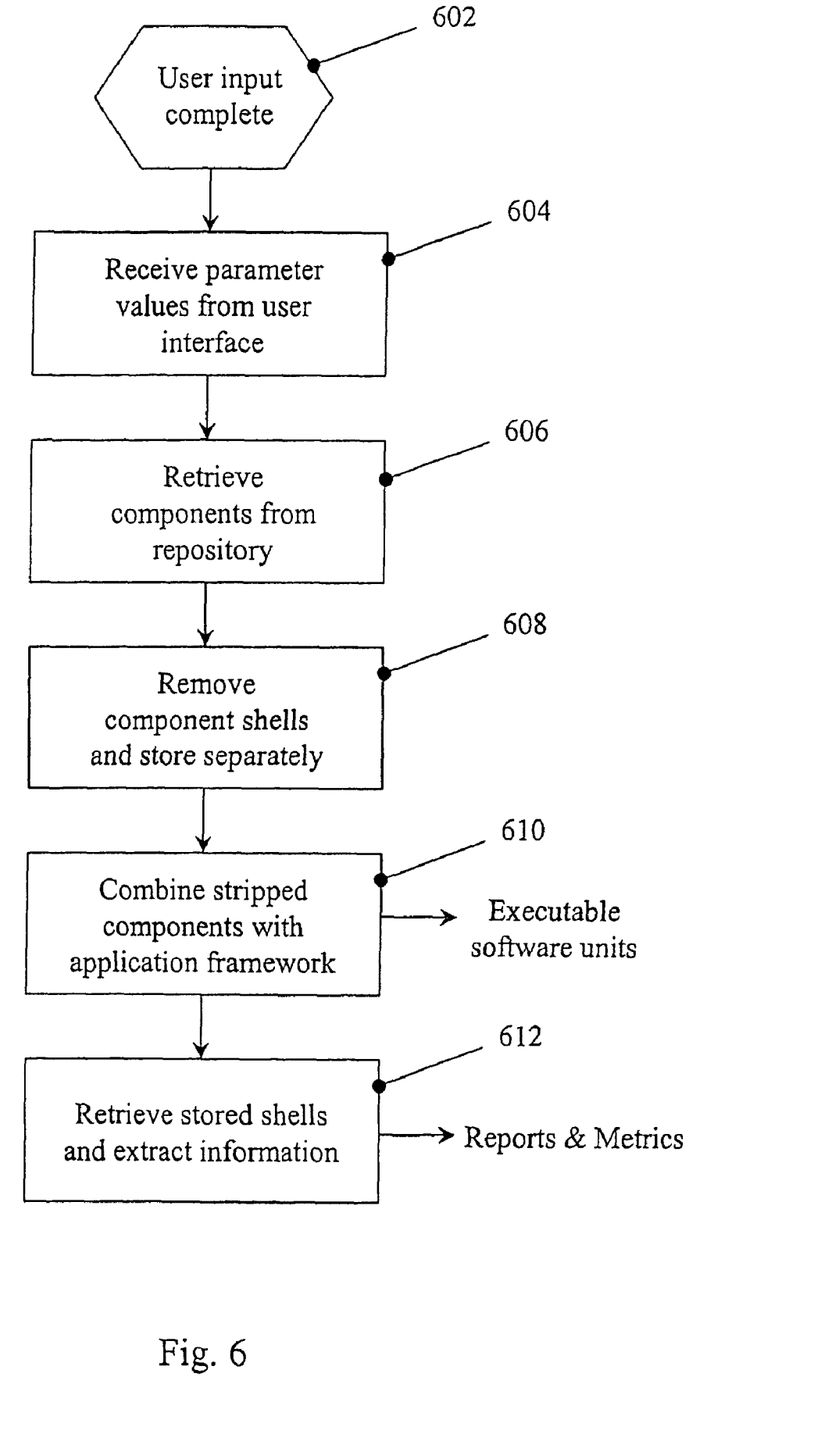
FIG. 6 is a flow chart for automatically generating a software component according to an embodiment of the present invention.

The application composer 403 is responsible for automatically generating the application software units. The means by which the composer 403 achieves this task is now described with reference to FIG. 6. First, in step 602 once the user input of the configurable parameter values is complete, the composer receives these values from the graphical user interface 401 in step 604. Next, in step 606 the composer 403 retrieves components required to constitute the application software unit from the repository 402. After retrieving the components, in step 608 the shells of the components are removed and stored separately. Subsequently, in step 610 these components whose shells have been removed are combined with the application framework 202 to produce executable software units. Finally, in step 612 the removed shells are examined and information is extracted from the shells to produce reports of, for example, which components were used to generate the application software unit, as well performance metrics for the whole application software unit such as total memory usage, total code size and total computation power required in millions of instructions per second.

It is thus seen that the embodiment according to the present invention described above achieves the objective of automatically generating the application software units of a network of sensors or actuators by utilizing a common application framework that allows multiple components to co-exist and co-operate, a repository of components, each of which is structured in a pre-determined manner, and a user interface that allows a user to set various parameters that govern the type and nature of sensor or actuator networking application to be generated. Further, the invention described above also achieves the objective of generating total performance metrics for generated software units.

Further modifications and variations to the embodiment described above can be made to achieve various enhancements. One such enhancement would be to perform the further step of combining the generated application software units with a pre-existing operating system or other pre-existing libraries or hardware drivers that provide various system services to automatically generate entire system software units.

A second enhancement would be to allow the user to set constraints regarding the memory usage, code size and computational resources available. The composer could then examine the performance metrics calculated for the entire software and check whether these metrics fall within the constraints imposed by the user. If they do not, user could be warned so that corrective action for optimizing particular components or changing the parameters of the network can be performed.

Figure 7:
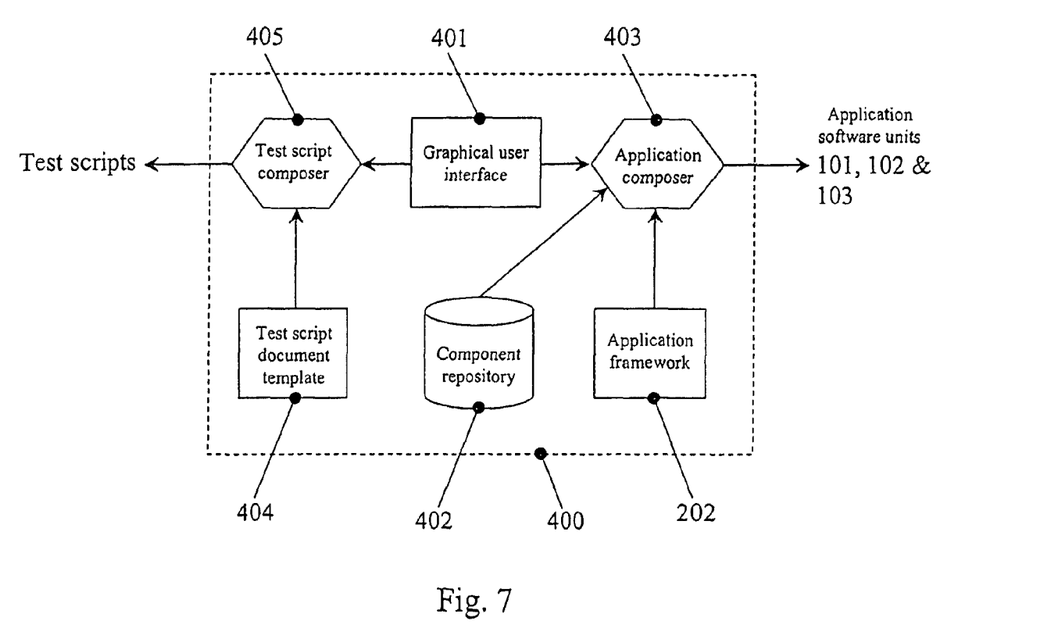
FIG. 7 is a schematic diagram of a system for automatically generating test scripts according to an embodiment of the present invention.

A second embodiment of the present invention relating to the automatic generation of test scripts for is now described. In general, test scripts describe the system to be tested, the operational parameters of the system, and the tests to be conducted to verify the operation of the system. As described above, in the case of sensor or actuator networks, all such networks are of a fundamentally similar nature but only differ in their operational parameters. As described above, these operational parameters are defined through a user interface. Thus, the invention described in the previous embodiment can be extended to automatic test script generation as shown in FIG. 7. A pre-defined test script document template 404 is used by a test script composer 405. The test script composer 405 receives the configurable parameter values from the user interface in a manner similar to the application composer 403. The test script composer 405 then combines these parameter values with the template 404 through the means of replacing fields in the document template with the obtained values to automatically generate test scripts.

Figure 8:
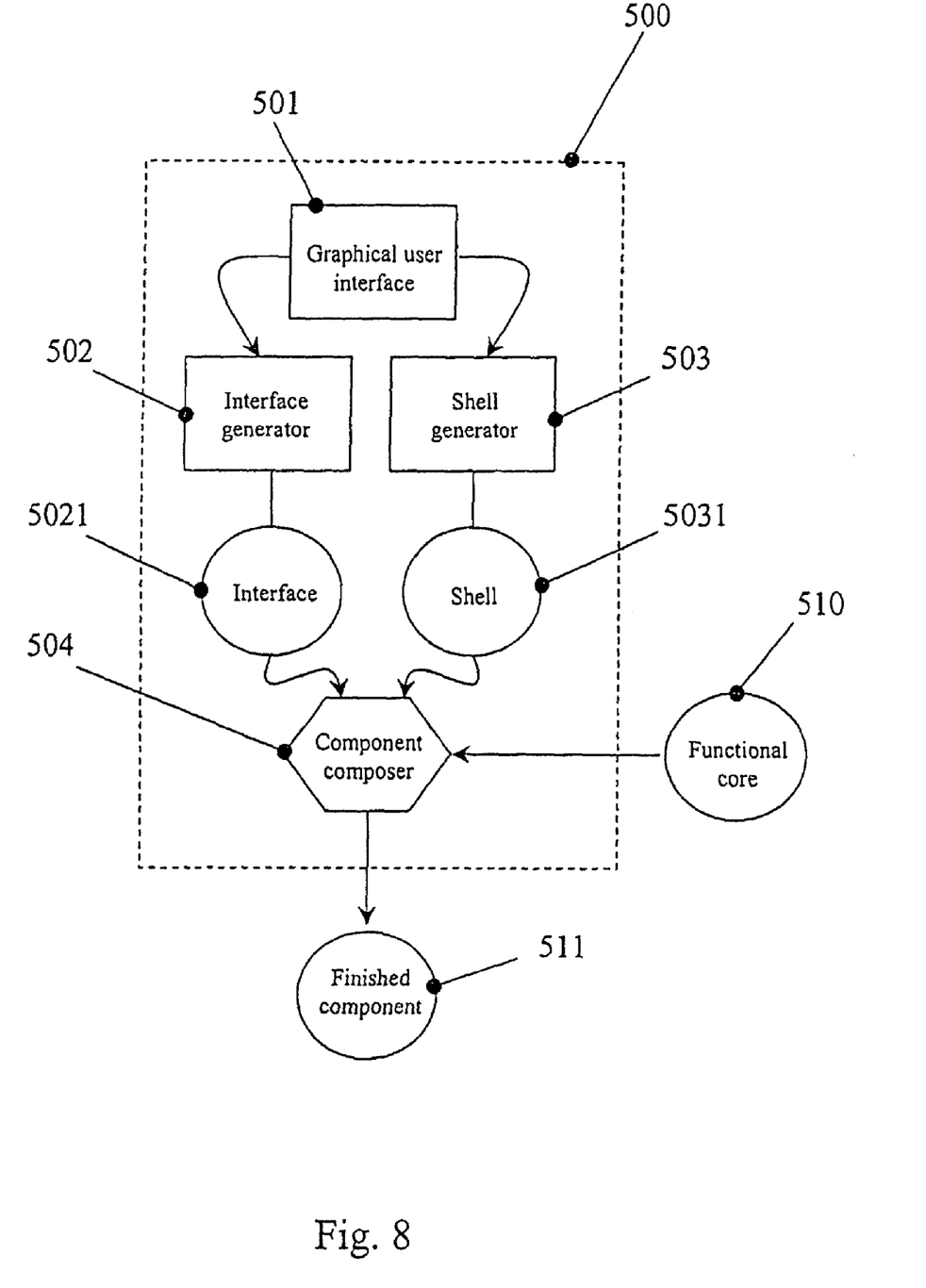
FIG. 8 is a schematic diagram of a system for generating components to store in a component registry according to an embodiment of the present invention.

A third embodiment of the present invention relates to the construction of the components themselves. As described earlier, a component consists of a functional core, an interface and a shell that provides information regarding the component. The functional core is typically programmed by a human to perform one or more logically related functions and unit tested to verify its operation. Once this human task has been completed, the task of componentizing this functional core can also be automated as described in this embodiment. Reference is made to FIG. 8 which shows the conceptual block diagram of a componentizer 500. The componentizer 500 comprises a graphical user interface 501, an interface generator 502, a shell generator 503 and a component composer 504.

The graphical user interface 501 allows a user to pick a functional core 510 through the means of, for example, choosing a source code file, choosing a pre-compiled object code file or choosing an intermediate bytecode object file to be interpreted by an interpreter. The user interface 501 further allows the user to specify the interface elements of the component according to a pre-defined format. This pre-defined format may, for example, comprise a specification of the events the components will generate and the events that the component should be registered for and a specification of the interface function or method names in the functional core that will generate and respond to events or, generate and send messages to other components. Moreover, the user interface 501 further allows the user to input information regarding the component shell such as the name of component, the function it provides and the algorithm and methods it uses, and performance metrics of the component such as memory usage, code size and computation power required in millions of instructions per second.

The interface generator 502 obtains the information regarding the component interface input through the user interface 501 and generates the component interface 5021 in a pre-defined format. Similarly, the shell generator 503 obtains the information regarding the shell from the user interface and generates the shell 5031 in a pre-defined format.

The component composer 504 combines the functional core 510 with the interface 5021 and the shell 5031 to produce a finished component 511, which can then be stored in a component repository.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for automatically generating an application software unit, comprising:
    a processor;
    a component repository, the component repository comprising one or more software components associated with functions of the application software unit;
    an application framework that stores parameter information regarding the one or more software components associated with the application software unit; and
    an application composer, operating on the processor, that uses the parameter information in the application framework to extract the one or more software components from the component repository, configure the one or more software components according to the parameter information in the application framework, and combine the one or more configured software components and the application framework to generate the application software unit, wherein the application composer extracts and configures the one or more software components from the component repository automatically, without requiring a user to specify which software components to extract or configure.

2. The system recited in claim 1, further comprising a graphical user interface that allows a user to enter the parameter information that is stored in the application framework.

3. The system recited in claim 2, wherein the graphical user interface comprises a wizard format to guide a user in entering the parameter information.

4. The system recited in claim 1, wherein each component in the component repository comprises:
    a shell comprising information regarding the component;
    a core providing functionality for the component; and
    an interface for allowing the component to interact with other components.

5. The system recited in claim 4, wherein the information in the shell comprises performance metric information related to execution of the component.

6. The system recited in claim 4, wherein the information in the shell comprises descriptive information describing the component.

7. The system recited in claim 1, wherein the application framework comprises:
    a configurable parameter storage element to store configurable parameters that determine how the application software unit is built and how it operates;
    a structure definition element that allows the components to co-exist and cooperate.

8. The system recited in claim 7, wherein the structure definition element comprises a message bus to which each component is connected that allows each component to pass a message to any other component.

9. The system recited in claim 7, wherein the structure definition element comprises:
    an event registry into which each component registers those events that it will generate and those events whose occurrence the component desires notification of; and
    an event dispatcher that sends notification of an event to each component that registered in the event registry to be notified of the event.

10. The system recited in claim 1, wherein the application software unit is generated in conformance with user-entered constraints.

11. The system recited in claim 1, wherein the application software unit is combined with one or more of a pre-existing operating system, a pre-existing library and a hardware driver to automatically generate a system software unit.

12. The system recited in claim 1, wherein one or more of the components stored in the component registry are generated automatically using a componentizer.

13. The system recited in claim 12, wherein the componentizer comprises:
    a graphical user interface that a user uses to input information about a component to be generated;
    an interface generator to generate a component interface in conformance with the user-entered information;
    a shell generator to generate a component shell in conformance with the user-entered information;
    a pre-generated component core; and
    a component composer to combine the component core, component interface and component shell into a finished component.

14. The system recited in claim 1, wherein the application software unit generated is a test script.

15. The system recited in claim 1, wherein the application software generated is used in a network of actuators and/or sensors.

16. A method for automatically generating an application software unit, comprising the steps of:
    receiving values of one or more configurable parameters for one or more software components stored in a component repository, the one or more software components associated with the application software unit;
    storing the received values of the one or more configurable parameters in an application framework;
    extracting and configuring the one or more software components from the component repository in accordance with the received values, wherein the one or more software components are extracted and configured automatically, without a user specifying which software components to extract or configure; and
    combining the software components with the application framework to generate the application software unit.

17. The method recited in claim 16, further comprising the step of receiving the values of the one or more configurable parameters from a user using a graphical user interface.

18. The method recited in claim 17, further comprising the step of providing a wizard format to assist the user in selecting the parameter values.

19. The method recited in claim 16, further comprising the step of generating each component stored in the component repository.

20. The method recited in claim 19, further comprising the step of creating at least one component in the component repository using a componentizer.

21. The method recited in claim 20, further comprising the steps of:
    receiving input information about a component to be generated;
    generating a component interface in conformance with the user-entered information;
    generating a component shell in conformance with the user-entered information;
    combining a pre-generated component core with the component interface and the component shell to create a finished component; and
    storing the finished component in the component repository.

22. The method recited in claim 16, further comprising the steps of:
    removing a component shell containing information about the component from each component to form stripped components; and
    storing the removed component shell, wherein the step of combining the components combines the stripped components.

23. The method recited in claim 22, further comprising the steps of:
    retrieving the stored shells; and
    extracting the information.

24. The method recited in claim 23, further comprising the step of generating the application software unit in accordance with the extracted information.

25. The method recited in claim 16, further comprising the step of generating the application software unit in accordance with user-entered constraints.

26. The method recited in claim 25, wherein the user-entered constraints include performance constraints.

27. The method recited in claim 16, further comprising the step of combining the generated application software unit with one or more of a pre-existing operating system, a pre-existing library and a hardware driver to automatically generate a system software unit.

28. The method recited in claim 16, further comprising the step of connecting each component to a message bus so that each component can pass a message to any other component.

29. The method recited in claim 16, further comprising the steps of registering with an event registry those events that each component will generate and those events whose occurrence each component desires notification of.

30. A system for automatically generating an application software unit, comprising:
    a processor;
    means for receiving values of one or more configurable parameters for one or more software components stored in a component repository, the one or more software components associated with the application software unit;
    means for storing the received values of the one or more configurable parameters in an application framework;
    means, performed by the processor, for extracting and configuring the one or more components from a component repository in accordance with the received values, wherein the one or more software components are extracted and configured automatically, without a user specifying which software components to extract or configure; and
    means, performed by the processor, for combining the software components with the application framework to generate the application software unit.

31. The system recited in claim 30, further comprising means for receiving the values of the one or more configurable parameters from a user using a graphical user interface.

32. The system recited in claim 31, further comprising means for providing a wizard format to assist the user in selecting the parameter values.

33. The system recited in claim 30, further comprising means for generating each component stored in the component repository.

34. The system recited in claim 33, further comprising means for creating at least one component in the component repository using a componentizer.

35. The system recited in claim 34, further comprising:
    means for receiving input information about a component to be generated;
    means for generating a component interface in conformance with the user-entered information;
    means for generating a component shell in conformance with the user-entered information;
    means for combining a pre-generated component core with the component interface and the component shell to create a finished component; and
    means for storing the finished component in the component repository.

36. The system recited in claim 30, further comprising:
    means for removing a component shell containing information about the component from each component to form stripped components; and
    means for storing the removed component shell, wherein the step of combining the components combines the stripped components.

37. The system recited in claim 36, further comprising:
    means for retrieving the stored shells; and
    means for extracting the information.

38. The system recited in claim 37, further comprising means for generating the application software unit in accordance with the extracted information.

39. The system recited in claim 30, further comprising means for generating the application software unit in accordance with user-entered constraints.

40. The system recited in claim 39, wherein the user-entered constraints include performance constraints.

41. The system recited in claim 30, further comprising means for combining the generated application software unit with one or more of a pre-existing operating system, a pre-existing library and a hardware driver to automatically generate a system software unit.

42. The system recited in claim 30, further comprising means for connecting each component to a message bus so that each component can pass a message to any other component.

43. The system recited in claim 30, further comprising means for registering with an event registry those events that each component will generate and those events whose occurrence each component desires notification of.

44. A system for automatically generating executable application software for a network of sensors or actuators, said executable application software comprising one or more of an executable software unit resident on embedded sensor or actuator nodes, an executable software unit resident on gateways that collect data from or control the operation of a plurality of said sensor nodes, and an executable software unit resident on a server that collects data from or controls the operation of a plurality of said gateways, said system comprising:

a processor;

a plurality of software components, each of which perform one or more logically related functions, each said software component consisting of a core that performs the function or functions of the component, an interface that allows the component to interact with other software components, and a shell that contains descriptive or quantitative information regarding the component;

a component repository that stores said plurality of software components;

an application framework that defines a structure of the executable application software and which provides an infrastructure for said software components to interact with each other; and a graphical user interface for inputting parameters of said network of sensors or actuators; wherein said system for automatically generating said executable software units chooses and configures one or more software components from the component repository automatically and does not require input from a user to specify which components are to be chosen and further comprises:

means, performed by the processor, for automatically choosing, without additional user input, a second plurality of said software components based on said parameters of said network of sensors or actuators;

means for retrieving said second plurality of software components from said component repository;

means for removing said shell that contains descriptive or quantitative information regarding the component from each of said second plurality of software components; and means, performed by the processor, for automatically combining, without additional user input, said second plurality of software components with said application framework to produce one or more of said executable application software units.

45. The system recited in claim 44, wherein said application framework comprises a message bus and a common message format such that any one of said components can communicate with any other component by exchanging messages on the message bus.

46. The system recited in claim 44, wherein said application framework comprises:

means for allowing any one of said components to send signals of events;

means for allowing any one of said components to register to receive specific signals of events and; and means for sending each of said signals sent by components to components that have registered to receive the specific signal.

47. The system recited in claim 44, further comprising means for quantifying performance metrics for said automatically generated application software units, said metrics including but not limited to total memory usage, total code size and total computational power required in million instructions per second.

48. The system recited in claim 47, further comprising means for calculating performance metrics of said automatically generated executable application software units by extracting metric information for each of said components from said shells that contain descriptive or quantitative information regarding the component.

49. The system recited in claim 47, further comprising:

means for calculating performance metrics of said automatically generated executable application software units by extracting metric information for each of said components from said shells that contain descriptive or quantitative information regarding the component; and means for combining said performance metrics of said automatically generated executable application software units with pre-existing information regarding equivalent metrics for said operating system kernels and hardware device driver software units.

50. The system recited in claim 44, further comprising means for combining said automatically generated executable application software units with pre-existing operating system kernels and hardware device driver software units to automatically generate complete system software units.

51. The system recited in claim 44, further comprising means for automatically generating test scripts for each of said automatically generated executable application software units through the means for combining said parameters of said network of sensors or actuators input through said graphical user interface with pre-existing test script document templates.

52. A system for generating a software component, said system comprising:

a processor;

a component repository that stores a plurality of said software components;

a graphical user interface for selecting a software core module, for specifying an interface of the software core module according to a first pre-defined format and for specifying a shell for the software core module that contains descriptive or quantitative information regarding the software core module according to a second pre-defined format; and an application framework that stores parameter information regarding the software component, the application framework operable to be combined with the software component to generate an application software unit;

said system for generating the software component, further comprising:

means, performed by the processor, for automatically combining the software core module with the interface of the software core module and with the shell for the software core module to produce the software component, wherein combining the software core module, the interface and the shell is performed without input from a user; and means, performed by the processor, for storing the said software component in the said component repository.

* * * * *